April 9, 1963     O. SCHUELLER     3,084,454
AEROSPACE ENVIRONMENT SIMULATOR

Filed June 5, 1962     5 Sheets-Sheet 1

INVENTOR.
OTTO SCHUELLER
BY
*Wade Lovitt*
*Charles & Wagner*
ATTORNEYS

INVENTOR.
OTTO SCHUELLER
BY
ATTORNEYS

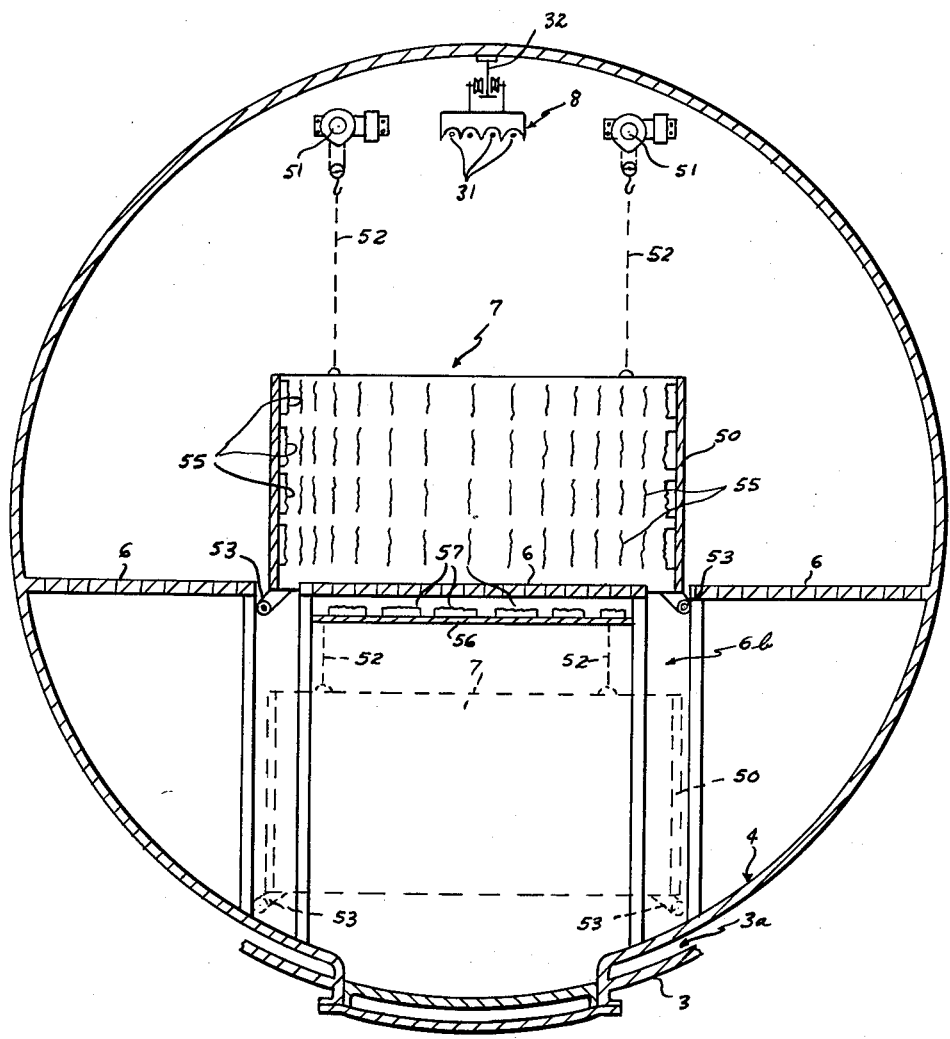

United States Patent Office 3,084,454
Patented Apr. 9, 1963

3,084,454
AEROSPACE ENVIRONMENT SIMULATOR
Otto Schueller, Dayton, Ohio, assignor to the United States of America as represented by the Secretary of the Air Force
Filed June 5, 1962, Ser. No. 200,291
13 Claims. (Cl. 35—12)
(Granted under Title 35, U.S. Code (1952), sec. 266)

The invention described herein may be manufactured and used by or for the United States Government for government purposes without the payment to me of any royalty thereon.

This invention relates to ground test facilities for simulating environment conditions for providing economical and practical methods for developing reliable aerospace weapon systems, including aerospace vehicles, personnel protective equipment and life support systems, and also for selection and training of competent astronauts and biomedical research related to survival of man outside of the earth's atmosphere, including the effects of direct and indirect solar radiation, infrared radiation from planetary surfaces and space vehicles, the radiative heat sink of the black sky, high vacuum of space and planetary atmospheres, and has for an object the provision of a single ground test facility to simulate these specific environmental parameters as they exist in orbits around the earth, on the moon and the nearer planets Mars and Venus, and is an improvement of my invention, Patent No. 3,010,-220, patented November 28, 1961, entitled "Means for Simulating Certain Environmental Conditions of Outer Space" (filed February 2, 1960, Serial No. 6,330), which patent provided two separate high vacuum chambers, one for simulating the lunar day or orbiting in the shade.

An object of this invention is the provision of a single environment chamber for simulating both explorations on the moon or orbiting around nearby planets in the sunshine, and also during a lunar night, thus providing the simulation of the most opposite environmental extremes in a single chamber with the greatest possible accuracy and flexibility, and without mutual interference.

A further object is the provision of a substantially spherical chamber, having a safety air lock and entrance, and a supporting platform or floor for supporting personnel or test equipment substantially at the center of the sphere, with provisions of means to cool the inner surface and interior of the spherical simulation chamber to simulate the heat sink of outer space on the black or star studded sky, together with solar simulator means which is movable across the top of the inner surface of the sphere for directing simulated solar rays toward the center of the sphere, and on a subject or test item, from different angles, simulating movement of the sun across the heavens relative to the subject or test equipment disposed on the platform within the sphere.

A further object includes the provision of infrared radiator means for directing infrared radiation onto the subject, personnel or item being tested, which radiator means is movable from a position above the floor, to a remote position below the floor, for simulating radiation in outer space and from the surface of planetary bodies.

A further object includes a cylindrical radiation simulator mounted in an encircling relation to the subject or item being tested, for axial movement above and below the supporting platform or floor.

A further object is the provision of a solar simulator mounted for movement in an arc across the inner surface of the upper half of the sphere, and retractable below the level of the supporting platform in addition to retraction of the cylindrical infrared radiators below the platform level.

A further object includes means for moving the solar simulator in an arc above the test item supporting platform, and means for moving the infrared cylindrical radiator above and below the level of the supporting platform, together with high vacuum diffusion pump means mounted within the sphere and below the supporting platform, and second infrared radiator means mounted directly under the supporting platform within the confines of the vertically movable cylindrical infrared radiator.

A further object is the provision of a compressed dry air reservoir, including means for quickly supplying dry air to the interior of the sphere to relieve the vacuum therein in case of an emergency, together with a safety air lock chamber for gaining access to the sphere without materially reducing the vacuum therein, including a vacuum pump for reducing pressure in the air lock independently of the reduction of pressure in the sphere, said air lock including closure members between the air lock chamber and the interior of the sphere, and between the air lock chamber and the outside atmosphere and including inspection window means for watching the interior of the space simulating sphere and the interior of the safety air lock chamber.

A further object includes the provision of a black wall coating on the interior of the sphere, and the provision of means for cooling the interior wall with a cooling medium such as liquid nitrogen or helium.

A further object is the provision of a single spherical space environment chamber in which the surrounding wall comprises inner and outer spaced spherical surfaces and means to vacuumize the space just mentioned, to retard heat or cold transfer between the interior of the sphere and the outside atmosphere.

A still further object is the provision of full utilization of the pumping capacity of the high vacuum diffusion pump means by providing a gap, corresponding to the mean free molecular path in the vacuum in the spherical space chamber, between the retracted infrared radiator and the chamber working platform or floor.

Other objects and advantages of the invention will become apparent from the following description and accompanying drawings in which like reference characters refer to like parts in the several figures.

Figure 1:
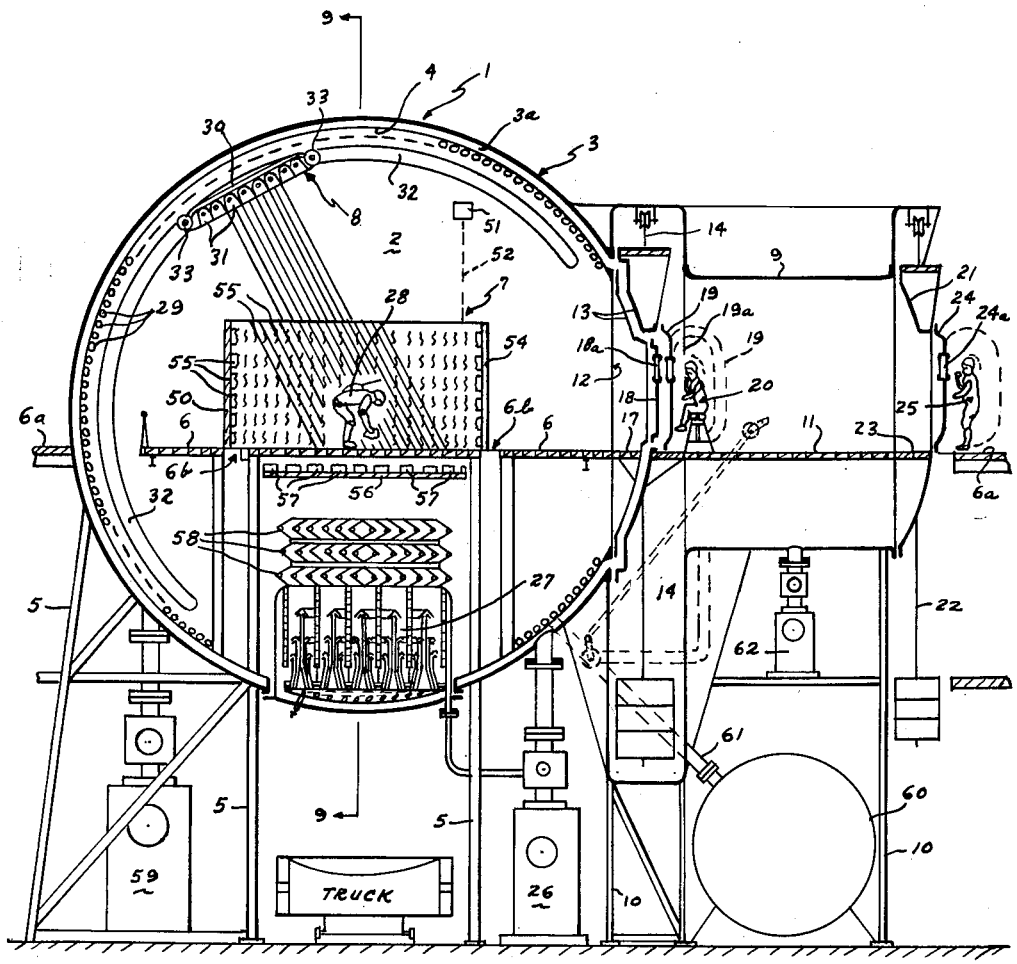
FIG. 1 is a somewhat schematic vertical sectional view through an improved space flight simulator, incorporating my invention, illustrating the disposition of the solar simulator and the infrared radiators in position for simulating a solar day, with a "space man" therein subject to the simulated lunar day conditions.
Figure 4:
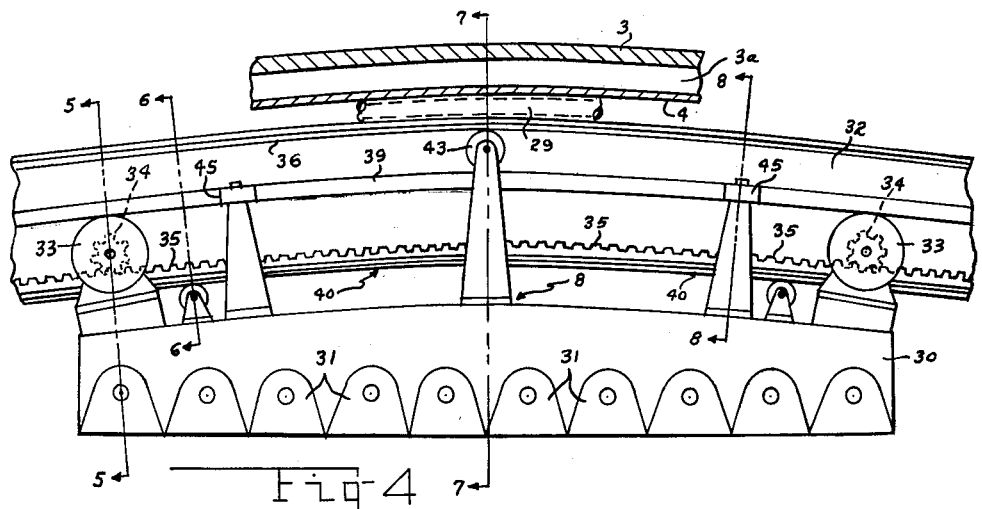
FIG. 4 is an enlarged fragmentary detail view (partly in section) illustrating the solar simulator, its supporting track, electrical contact means, and motors for moving the solar simulator in an arc across the top of the inner surface of the space environment chamber to simulate the travel of the sun across the heavens.
Figure 5:
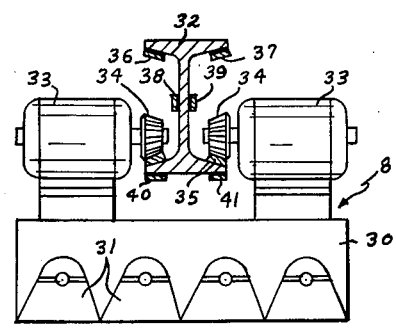
FIG. 5 is a sectional view taken about on the plane indicated by line 5—5 in FIG. 4.
Figure 7:
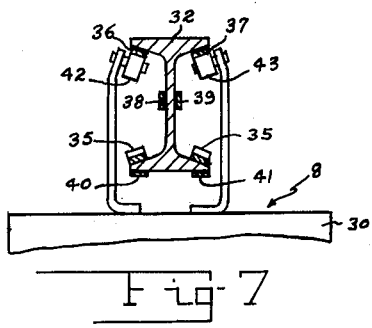
Figure 6:
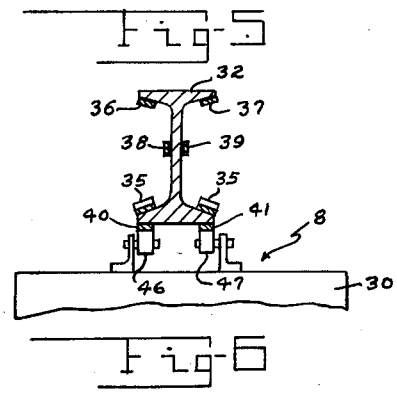
Figure 8:
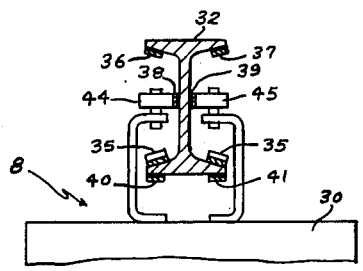

FIGS. 6, 7 and 8 are detail sectional views, taken about on lines 6—6; 7—7; and 8—8 in FIG. 4, of the contact strips and contacts for supplying power to the solar simulator for illumination and control movements thereof; and FIG. 9 is a transverse vertical sectional view taken about on the plane indicated by line 9—9 in FIG. 1, schematically depicting the power means for elevating and retracting the cylindrical infrared radiator and "Albedo" simulator.

Referring more particularly to FIG. 1 the reference numeral 1 denotes my improved spaced flight simulator or outer space environmental simulating chamber generally, consisting of a vacuumtight spherical compartment 2 having an outer shell 3 and an inner spaced vacuumtight shell 4 with the space 3ª therebetween adapted to be vacuumized to substantially eliminate heat or cold transfer between the inner and outer spherical shells 3 and 4.

The outer space test facility 1 is fixed on rigid supporting members 5, suitably braced for rigidity, and contains a test item or personnel supporting platform or floor 6 preferably extending horizontally substantially through and slightly below the center of the interior of the sphere 1, the platform 6 being disposed on the same level as an exterior loading or access platform 6ª, and is provided with a circular or ring shaped opening 6ᵇ for the reception and passage therethrough of an infrared radiator 7, of cylindrical configuration, later to be set forth.

Figure 2:
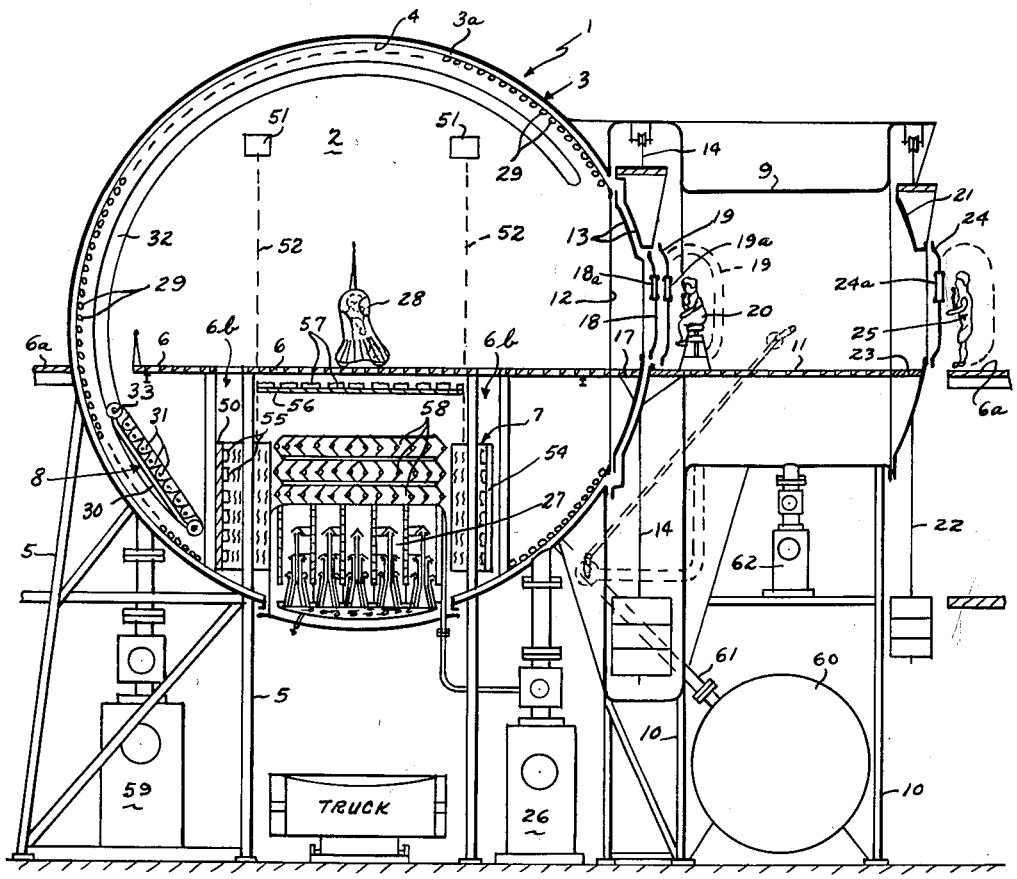
FIG. 2 is a similar schematic vertical sectional view taken through the improved space flight simulator or outer space environment sphere incorporating my invention, with the solar simulator and infrared radiator retracted below the supporting floor, simulating a lunar night, with a man at rest therein.
Figure 3:
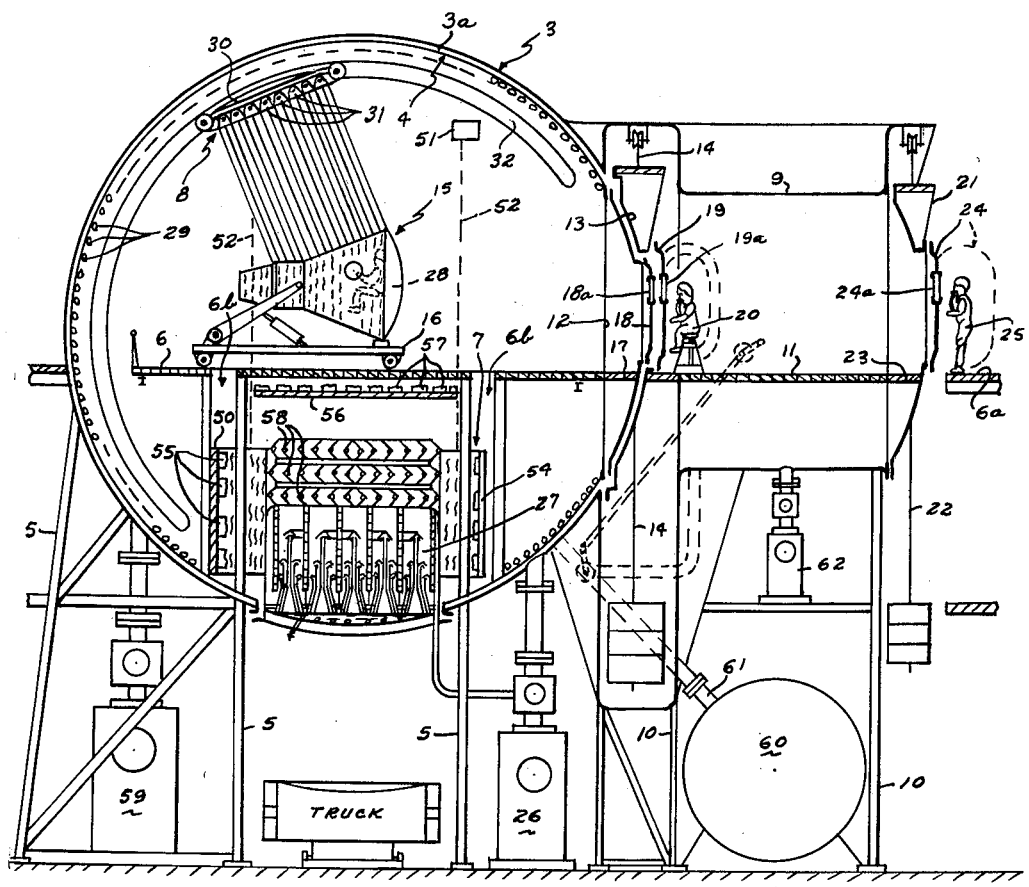
FIG. 3 is a similar view, depicting a space capsule in orbit around the earth (Venus or Mars) simulating a solar day, and with the cylindrical infrared radiation means retracted and turned off.

The floor or platform 6 also terminates sufficiently short of the left side of the inner surface of the test facility (as seen in FIGS. 1, 2 and 3), to permit the passage of a movable solar or sunlight simulator 8, as later set forth, from below the platform, to progressive positions above the platform, simulating the movement of the sun across the heavens during a solar day in outer space, or on the moon, or on one of the nearby planets.

Access to the interior of the environmental chamber 2 is gained through a safety air or vacuum lock of cylindrical form, indicated at 9, carried on suitable supports 10 and containing a platform 11 extending longitudinally therethrough.

The chamber 2 is provided with a large circular access opening 12 having a removable closure 13 carried by suitable counter weighted support means 14 so that the closure section 13 may be released and lowered out of the way in order to bring larger equipment, such as a "manned" space capsule 15 mounted on a suitable carrier 16, as seen in FIG. 3. The closure member or unit 13 is preferably also double walled to provide for a vacuum therebetween when in place and contains a short floor 17 providing a continuation of the main test item supporting floor 6.

The closure member 13 is provided with suitable smaller personnel access doors 18 and 19 having windows 18ª and 19ª therein for an inspector or safety officer, such as indicated at 20, to watch and control the results of a test and safety of personnel in the chamber 2.

The cylindrical air lock or entrance chamber 9, being comparatively large in cross section is also provided with a second removable closure member 21 counter weighted at 22, so that the same may also be released and lowered out of the way, like the closure 13, in order to insert or remove larger or bulkier test equipment into or out of the chamber 2, and also carries a short platform 23 to form a continuation of the platform 11.

The large outer closure 21 for the access air lock 9 is provided with a smaller outer door 24 for access of personnel and small test equipment into and through the safety air or vacuum lock chamber 9, into or out of the spherical "outer space" environmental chamber 2, the door 24 also being provided with a window 24ª for viewing the interior of the air lock chamber 9 and personnel therein during testing operation, such as indicated at 25.

Suitable "Fore" vacuum pumps 26 are provided, in communication with the space 3ª between the inner and outer shells 3 and 4, and the interior of the chamber 2, and also in communication with suitable high vacuum diffusion pumps 27 disposed within the spherical chamber below the floor or platform 6 having suitable power means (not shown) to reduce the pressure within the spherical chamber 2 and space 3ª substantially to a perfect vacuum, simulating the lack of atmosphere or pressure in outer space, or on the moon, or nearby planets.

It will be observed that entrance into and exit from the spherical environmental space chamber can be made quickly without completely losing the vacuum by reducing the partial pressure in the safety lock chamber and allowing a pressure rise in the chamber 2 to balance the air lock pressure, after which the doors 18 and 19 may be opened, as seen in dotted lines in FIGS. 1, 2 and 3, and the safety officer or personnel (in properly pressurized suits) can enter the main chamber, for instance, to rescue a subject being under test, such as indicated at 28, in the event of failure of his "space" equipment.

The inner surface of the inner shell 4 is preferably coated or painted with a suitable "black" coating to provide a black wall, and substantially the entire inner surface of the chamber 2 is provided with closely spaced "coolant" piping or finned conduits 29 in which a suitable very low temperature coolant is circulated, such as liquid nitrogen or helium, thus providing the interior of the chamber with a "heat sink" simulating the low temperature of the black, star speckled sky in outer space.

The solar simulator 8, as seen more particularly in FIGS. 4 to 8, comprises a support 30 having a plurality of radiant heaters such as sun lamp reflectors 31, and may also include X-ray projection lamps for simulating other kinds of radiation existing in outer space, and on the moon or planets, during the solar day. The lamps 31 may be controlled in any suitable manner, preferably outside of the space chamber 2.

The simulator 8 is mounted for travel on an arcuate track in an arc across the top of the inner surface of the chamber 2, simulating travel of the sun across the heavens and for this purpose an I beam arcuate track 32 is provided which extends around the front end of the platform 6, materially below the same and across the top of the chamber 2 to the top of the large access opening 12.

The simulator support 30 preferably carries motor or drive means 33, suitably bracketed thereto, having drive shafts carrying gears 34 meshing with elongated rack members 35 fixed to the flanges of the beam 32.

The beam 32 carries insulated contact strips 36, 37, 38, 39, 40 and 41 each disposed for electrical contact with one of the suitable contact rollers on the solar simulator for establishing selective electrical control to the lamps 31 and motors 33, for controlling the intensity and movement of the solar simulator 8.

The cylindrical infrared radiator unit 7 comprises a cylindrical support 50, mounted for vertical adjustment above and below the platform 6, as seen in FIG. 9 in full and dotted lines, being adjusted to its positions by suitable electric motors 51 controlled exteriorly of the chamber 2, having lifting chains or the like 52.

The cylindrical support 50 is suitably guided into the substantially circular or ring-shaped space or well 6ᵇ in the platform 6 by guide means 53.

It should be noted that the radiator 7, as seen in FIGS. 1, 2 and 3 has an access opening 54 therein, in alignment with the access opening 12 and door 18, so that test items or personnel can be placed on or removed from the platform 6 within the radiator 7 when the same is in elevated position, as seen in FIG. 1.

The inner surface of the radiator unit 7 is provided with a plurality or a great number of electric radiators or radiant heaters 55 to simulate radiation from the surface or surrounding area, on a space capsule or "space personnel" during a solar day or lunar night, after landing on the moon, or on one of the planets.

Like the solar simulator 8, the electrical radiation elements 55 can be controlled, preferably in units, from the exterior of the space chamber 2, to simulate different environmental radiation temperatures, in any suitable manner.

A further source of radiation, such as infrared radiation, for simulating surface or ground radiation after landing, or working on the moon (or on one of the nearby planets), during the solar day, as seen in FIG. 1, or during a lunar night, as seen in FIG. 2. This comprises a support 56 disposed under the floor 6, in spaced relation thereto, on which are mounted suitable heater means 57, such as infrared radiators, or "other radiation" projector means, the intensity level thereof being suitably controlled from any conventional power source, exteriorly of the environment chamber 2.

Also located below the floor 6 and below the infrared radiation source 57 are "cooling traps" 58 in which can also be circulated a suitable extra low temperature cooling medium, such as liquid nitrogen, or liquid helium, this cooling medium 58 being disposed directly above the "high vacuum" diffusion pump means 27.

Suitable cryostats 59 are provided (exteriorly of the chamber 2) for circulating the cooling medium in the "cooling" conduits 29 for maintaining the desired low temperature levels within the chamber 2 for simulating the "heat sink" of the surrounding "black sky" of outer space, during the operation of the space environmental chamber 2.

In the event of failure or malfunction of the test chamber or tests conducted therein, such as oxygen supply equipment for a prospective astronaut located within the chamber 2, means are provided for substantially immediately bringing the pressure in the chamber from substantially a vacuum ($10^{-5}$ mm. Hg) to about normal atmospheric pressure, or in the event that pressure in the air lock 9 is being maintained at some predetermined intermediate low pressure, say equivalent to 15,000 to 40,000 feet altitude, the pressure in the chamber 2 can be very quickly raised to the pressure in the air lock 9 and the safety officer 20 can enter and "rescue" the "astronaut," if necessary.

The means for quickly restoring pressure in the chamber 2 comprises a suitable compressed "dry" air cylinder 60 and suitable pump or compressor means which may be connected to the "Fore" vacuum pump means 26 so as to supply the air cylinder 60 with sufficient dry air, to bring the pressure in the environmental chamber back to normal, or substantially normal pressure quickly, say within ten or fifteen seconds of time when released. A suitably valved conduit 61 is provided between the chamber 2 and the compressed dry air chamber 60 for releasing the dry compressed air into the outer space simulating chamber 2, when necessary. The employment of dry air is desirable to prevent condensation and fog in the chamber 2, following an "outer space" simulation.

The disposition of the high capacity diffusion pump means 27 entirely within the chamber 2 is important in that it reduces energy consumption, sealing and leakage problems, and also utilizes the otherwise dead space below the chamber floor 6.

The solar simulator 8, as near as possible, simulates the energy spectrum of the sun, consisting of about 51% infrared from 7,000 to 100,000 A. wave length (1 A. =one Angstrom unit=$10^{-7}$ mm.), 41% visible light from 3,800 to 7,000 A., and 7.5% ultra violet from 2,000 to 3,800 A. and can be simulated by several methods, such as carbon arcs with various impregnations, high pressure mercury lamps, xenon lamps, and their combinations with tungsten lamps, filters, lenses, and reflectors all suitably controlled. The short wave ultra violet from 100 to 2,000 A. represents less than 0.2% of the total energy and can be simulated in the reflector units by high voltage low pressure gas discharge, also the X-ray region from 100 A. to 1 A. can be reproduced by a low voltage X-ray source, the choice of the source depending upon the purpose and required simulation. For the facility in question, simulation in the wave length region between 0.2 and 4 microns (2,000–40,000 A.) which include about 99% of the total solar radiation, would be sufficient.

The solar simulator 8 is preferably subdivided into smaller units to cover the range of irradiation intensity from about 590 watts per square meter (on Mars), 1400 watts per square meter (in earth orbits and in the moon) to 2600 watts per square meter (in the solar orbit of Venus) without changing the spectral energy distribution. Switching on a proper number of sun lamps 31 allows also for adjusting the irradiation field to the configuration of the test subject.

The infrared radiators 7 and 57 combined with adjustable reflectors and a series of sun lamps 55 simulate the infrared radiation and "albedo" of the earth and its atmosphere, the moon, and the planets Mars and Venus, and include a circular floor panel, part of the supporting platform 6, in combination with the cylindrical wall radiation unit 7 with its opening 54 opposite the door 18 in the safety lock 9.

The "flexible" arrangement of the solar simulator 7 and the infrared and "albedo" simulators 7 and 57 permits an accurate and realistic simulation of the whole range of thermal and vacuum environments and their cycles between the most opposite extremes in a single chamber without mutual interference, such as typical situations encountered in lunar and solar orbital missions, such as a day and a man working in a space suit as seen in FIG. 1 with the solar simulator switched on and "moving across the heavens," and the infrared and albedo simulators 7 and 57 switched on and above the platform 6, simulating infrared radiation and "albedo" from crater walls or mountains, and without the subject 28 changing his location the solar simulator and infrared radiators and "albedo" simulator can be switched off and retracted below the level of the floor 6 with only the black "heat sink" still in operation, a lunar night can be simulated with the occupant under a cold black, star speckled sky or outer space heat sink, as seen in FIG. 2 (with the occupant 28 at rest, in a moon capsule).

By utilizing the same chamber 2 with the infrared and albedo simulators switched off and retracted, a space capsule can be positioned on the platform 6 with the heat sink in operation and the solar simulator in operation directing its rays on the capsule while moving along the track 32 in an arc can effectively simulate a space capsule in orbit in the rays of the sun, and as solar simulator 8 moves below the platform, and is switched off, a simulation of the space capsule moving into the shade in outer space, for instance into the shadow of the earth, is accomplished.

It might be noted that the lower portion of the spherical environmental space chamber is also provided with an opening and double walled cover plate on which can be mounted, for removal or adjustments, the high vacuum diffusion pump or pumps 27 and the cooling traps 58, which are connected so that they may be supplied with a cooling medium, such as liquid nitrogen, liquid helium, etc. Any suitable source for supply and circulation of the cooling medium may be employed such as cryostats indicated at 59 which also supply the extreme cooling medium in the conduits 29.

Also with the solar simulator 7 and the infrared albedo radiators or simulators switched off and disposed below the floor 6, an unrestricted movement of the molecules within the chamber 2, above the floor is provided.

As shown, separate vacuum pump means 62 is provided for exhausting air from the safety lock chamber 9.

The operation of my improved single outer space environment facility should be clear from the above description, in which a test can be conducted, simulating a manned space capsule in orbit, during sunshine, and in shade, and after landing, and during a lunar night as well as a solar day, without interruption during a prolonged simulated test, including simulation of conditions likely to be encountered by an astronaut on the moon or nearby planets, in the solar day, as well as during the "lunar" night time.

Preferably during an outer space environmental test the safety air lock chamber pressure is lowered to an equivalent of about 25,000 feet altitude (280 mm. of Hg.) while the main chamber is in operation, this being considered as a safe altitude at which decompression sickness (bends) rarely occurs. The volumes of the main chamber 2 and the safety air lock chamber 9 are preferably so proportioned that when the air in the safety air lock 9 is released into the main chamber 2 the pressures in both chambers equalize at a simulated altitude of about 40,000 feet (140 mm. Hg.) within a few seconds. Therefore, there is a decompression valve (and conduit) between the main chamber 2 and the safety air chamber 9 which is operable from within the safety air lock chamber, also the outside air, or dry air from the storage vessel 60 is admitted to equivalent ground level atmospheric pressure to pressurize both chambers together in a reasonable length of time to allow removal of the test subject.

Carrying the safety air lock 9 with the inside observer, at higher simulated altitude valuable time is saved to rescue a test subject from the most critical level above 40,000 feet. Further repressurization to ground level can be continued at a slower rate, normally not exceeding about 25 mm. Hg per second, which can be considered as a safe limit to prevent ear damage if eustachian tubes remain open.

While I have described my invention in detail for the preferred form shown, it will be understood that modifications may be made without departing from the spirit and scope of the invention as defined in the claims which follow.

I claim:

1. An outer space environment simulating facility comprising, a spherical vacuum-tight chamber having an entrance, a door for closing said entrance, supporting platform means fixed horizontally within said spherical chamber for receiving a test item centrally thereon through said entrance, vacuum pump means within said chamber below said platform for creating a substantially perfect vacuum in said chamber, a solar simulator mounted within said chamber for arcuate movement across the upper inner surface of the chamber above said supporting platform means from a point below said platform means remote from said entrance to a point above said platform means adjacent said entrance, simulating movement of the sun across the heavens above a test item when disposed on said platform means substantially centrally thereof, means for cooling the inner surface of said chamber to simulate the "seat sink" of outer space, and infrared radiation means mounted within said chamber for vertical movement in surrounding relation to the central portion of said platform and a test item when disposed thereon, between positions above and below said platform.

2. An outer space environment simulating facility comprising, a spherical vacuum-tight chamber having spaced inner and outer walls, a test item supporting platform extending horizontally substantially through the center of said chamber to receive and support a test item thereon substantially at or adjacent the center of said chamber, said platform having a circular infrared radiator receiving opening formed therethrough surrounding the central portion of said platform to surround a test item thereon, substantially cylindrical infrared radiator means mounted within said chamber for vertical adjustment through said circular infrared radiator receiving opening, between positions above said platform and below said platform, including infrared radiation projection means on the inner surface thereof, for directing radiation inwardly toward the axis thereof, for simulating infrared radiation and albedo of the earth and its atmopshere, the moon, and the planets, on a subject disposed on said platform within the confines of said cylindrical infrared radiator means.

3. An outerspace environment chamber as set forth in claim 2, including infrared radiation projection means disposed below the under surface of the supporting platform for directing infrared radiation against the supporting platform for heating the same, to simulate the albedo from the test item supporting surface, independently of radiation from said vertically movable infrared radiation means.

4. Apparatus as claimed in claim 3, including a cylindrical safety air lock chamber fixed to said spherical chamber having an access opening in its outer end, an access door for closing said opening, a horizontal supporting platform thereon on the level of the platform within the spherical chamber, an access door between the safety air lock chamber and the spherical chamber, and vacuum pump means for evacuating said safety air lock chamber.

5. Apparatus as claimed in claim 4, including an arcuate track extending from a point materially below the level of said supporting platform at an end thereof remote from said safety air lock chamber across the top of the inner surface of said spherical chamber substantially to said access door, a solar simulator carried by said track for movement thereon across the inner surface of the spherical chamber, for simulating movement of the sun across the heavens above said platform during a solar day in outer space or on the moon or one of the nearby panets.

6. Apparatus as set forth in claim 5, including means for moving said solar simulator along said track, and retracting said solar simulator below said platform, and for retracting said cylindrical infrared radiation projection means below the level of said platform, for simulating a lunar night within said spherical chamber with said solar simulator and cylindrical infrared radiation projection means turned off, and including high vacuum pump means within said spherical chamber connected thereto for creating a substantially perfect vacuum within said spherical chamber, for simulating the vacuum of outer space, including cryostat means and refrigerant conduit means substantially covering the inner surface of the spherical chamber, for cooling said inner surface to simulate the "heat sink" of the black star speckled sky of outer space, and on the nearby planets during a lunar night, when the solar simulator and cylindrical infrared radiator means are switched off and retracted below the level of said supporting platform.

7. In an outer space environment simulating facility comprising a spherical vacuum-tight chamber having an outer spherical shell and an inner spherical shell spaced therefrom, means for creating a high vacuum therebetween to prevent heat or cold transfer therebetween, a supporting platform extending horizontally substantially through the center of the spherical chamber terminating short of the inner wall at one end, dividing the spherical chamber into an upper environmental simulation chamber and a lower chamber, said upper chamber having an access opening therein above the level of the platform for access to the supporting platform, an arcuate guide track fixed in said upper chamber and extending substantially from said access opening across said upper chamber above the center of said supporting platform and around the end thereof materially into said lower chamber, a solar simulator longitudinally movable along said track between the opposite ends thereof including radiation projection means thereon for simulating the energy spectrum of the sun in a direction substantially toward the central portion of the platform during its movement along the track above the platform, and retractable by said simulator below the level of the platform, said platform having a central portion adapted to receive and support a test item for outer space simulations, and formed with a circular infrared radiator and albedo simulator receiving well inclosing the said central portion, a cylindrical infrared and albedo simulator carried by said upper chamber for axial movement between positions in said upper chamber and in said lower chamber and means for raising and lowering the same to said positions, said infrared simulator having a cylindrical wall formed with an access opening therein facing said access opening in said upper chamber for entrance thereinto while in elevated position, a second infrared radiation means fixed in said lower chamber for projecting infrared radiation upwardly against said supporting platform, said cylindrical and fixed infrared radiation means including sun lamp means for simulating infrared radiation and albedo of the earth, and the planets Mars and Venus during a solar day, and during an orbital flight of a manned capsule, high vacuum pump means fixed in said lower chamber below said second infrared radiation means for reducing the pressure within said spherical chamber and between said inner and outer spherical shells to a substantially perfect vacuum to simulate the vacuum of outer space, refrigerating conduit means adjacent the inner surface of said inner spherical shell including a "black" coating substantially covering said inner surface, and cryostat refrigerant circulating means connected for circulating a very low temperature refrigerant such as liquid nitrogen therein, for simulating the heat sink of outer space.

8. Apparatus as claimed in claim 7 including a compressed dry air chamber having conduit means therefrom for relieving the vacuum in said spherical chamber.

9. Apparatus as claimed in claim 8 including a safety air lock chamber inclosing said access opening having a supporting floor extending therethrough substantially on the level of said supporting platform, said safety air lock having an outer access opening therein, a door closure therefor, and vacuum pump means for producing a partial vacuum in said safety air lock.

10. An outer space simulating facility comprising a spherical chamber, a horizontal test item supporting floor extending substantially through the center of the chamber dividing the same into an upper hemispherical environmental test chamber and a lower chamber, refrigeration conduit means lining the inner surface of said spherical chamber, including a black heat absorbing coating, and means for circulating a low temperature refrigerant through said conduit means, for simulating the "heat sink" of outer space, an arcuate track extending across said upper chamber adjacent the inner surface thereof, in a plane substantially through the center of the spherical chamber perpendicular to said floor, said floor having a circular slit formed therein substantially surrounding the center of said floor portion, a substantially cylindrical infrared radiator mounted in said cylindrical slit for vertical adjustments therethrough between a position below the said floor to positions above said floor, said infrared radiator having infrared radiation means carried thereby for projecting infrared radiation inwardly toward the central axis thereof, said cylindrical infrared radiator formed with an entrance opening in one side thereof for placing a test item on the floor within or removing said test item therefrom while said infrared cylindrical radiator is in elevated position above said floor, means for creating a high vacuum within said spherical chambers for simulating the vacuum of outer space within said upper chamber, a solar simulator mounted for travel along said arcuate track from one end thereof to the other for simulating the travel of the sun across the heavens during a solar or lunar day, said spherical chamber having an access opening and door therefor located above said floor substantially in alignment with said opening in said cylindrical infrared radiator, said solar simulator including radiation projection means thereon for projection of radiation simulating the radiation from the sun toward the central position of said spherical chamber during its travel along said track above said floor.

11. Apparatus as claimed in claim 10 including a safety air lock chamber having an access door therein disposed in alignment with said entrance opening in said spherical chamber, means for reducing the pressure in said safety air lock chamber to a predetermined pressure, and valved conduit means for equalizing the pressures in said spherical chamber and said safety air lock chamber.

12. Apparatus as claimed in claim 11 including a repressurizing dry air pressure chamber, and valved conduit means therefrom to said spherical chamber for supplying said spherical chamber with dry air, to relieve the vacuum therein and prevent moisture condensation within said spherical chamber when the vacuum in said spherical chamber is relieved at the termination of a simulated outer space environmental test within said spherical chamber.

13. A test facility as claimed in claim 12 including infrared radiation projection means fixed below said floor for heating the floor in the area thereof inclosed within said circular slit, for simulating, together with said cylindrical infrared radiator, the albedo during a solar day while on the moon, or on a nearby planet.

References Cited in the file of this patent

UNITED STATES PATENTS

| | | |
|---|---|---|
| 3,010,220 | Schueller | Nov. 28, 1961 |
| 3,064,364 | Schueller | Nov. 20, 1962 |